United States Patent Office 3,099,687
Patented July 30, 1963

3,099,687
PREPARATION OF ALPHA,ALPHA-DIALKYL-BRANCHED MONOCARBOXYLIC ACIDS FROM OLEFINS, CARBON MONOXIDE, AND WATER
Gerhard Rohlffs, Kamen, Westphalia, and Stefan Pawlenko, Bochum-Werne, Germany, assignors to Schering A.G., Berlin, Germany
No Drawing. Filed July 5, 1960, Ser. No. 40,543
Claims priority, application Germany July 7, 1959
6 Claims. (Cl. 260—533)

This invention relates to a process for preparing carboxylic acids and it has particular relation to the preparation of $\alpha,\alpha$-dialkyl-branched carboxylic acids.

It has been known that the synthesis of $\alpha,\alpha$-dialkyl-branched carboxylic acids from olefins branched at the double bond (such as isobutylene, 2-methylpentene-1,2-ethylhexene-1), carbon monoxide and water can be carried out in the presence of $BF_3$ catalysts with good yield under mild conditions (50–200 atmospheres' pressure, 0–50° C.). An essential disadvantage consists in that the catalyst has to be added in stoichiometric amount and this means considerable expenses in view of the high price of $BF_3$ and the difficulties occurring in the regeneration of the catalyst.

It has now been found that the above described synthesis can be carried out under mild conditions and with good yield with the use of only catalytic amounts of $BF_3$ if the water consumed during sythesis is continuously supplemented.

If the synthesis is carried out—in the manner hitherto considered necessary—with a catalyst poor in water, then the $BF_3$ used in stoichiometric amount remains fixedly bound to the carboxylic acid formed. It cannot be split off from the complex until after the synthesis, by the addition of water.

The amount of water used and maintained according to the process of this invention in the reaction space is selected in such manner, that although the synthesis still takes place easily, simultaneously the carboxylic acid-$BF_3$ complex formed can be easily split with the re-formation of monohydroxyfluoboric acid. In this manner, the $BF_3$ stabilized by the addition of sulfuric acid, acts as a genuine addition catalyst for water and carbonmonoxide. The number of carboxylic acid mols, which can be synthetized with one mol $BF_3$, is practically unlimited. It is dependent only on the kind and dimensions of the apparatus used in the reaction. In carrying out the reaction in batches, the olefine and water are sprayed in until the reaction vessel is filled. In a fully continuously operated apparatus, the carboxylic acid formed is constantly discharged and the relatively small amounts of $BF_3$ and sulfuric acid which are carried over by the carboxylic acid, are supplemented during spraying in the ingredients.

Example 1

In a V4A–5 autoclave provided with a magnetic stirrer, 500 grams of a catalytically acting mixture consisting of 3 mols (207 grams) $BF_3$, 1.35 mol (133 grams) $H_2SO_4$ and 8.9 mols (160 grams) water are introduced and CO is introduced into the autoclave up to a pressure of 110 atmospheres. Subsequently a mixture which consists of 800 grams of iso-butylene (of 96%, 13.7 mols), 1000 grams of heptane, and 185 ml. (10.25 mols) of water, and is kept in a container under CO-pressure, is injected into the autoclave uniformly at 30–35° within 3½ hours with 2 pumps. Before the injecting is terminated, the pressure of CO increases to 145 atmospheres due to the excess of CO and the reduction of free space. From the autoclave, 3351 grams reaction product were removed, from which, without the addition of water 455 grams of catalyst ready for use, separated.

After being processed over the Na-salts and after fractionation, the reaction product yields 1067 grams (10.45 mols) of pure trimethylacetic acid (melting point 34°, boiling point 163–164°, acid number 549) and 198 grams higher acids (acid number 332, $n_D^{20}$ 1.4420). From the heptane extract 57 grams of olefin polymerization products were isolated. Based on the isobutylene introduced into the reaction, the yield of trimethylacetic acid amounted to 76.4% of the theory. With the separated 455 grams of the catalyst a further test was carried out under the same conditions and with an equal starting charge of isobutylene. Thereby 1070 grams of pure trimethylacetic acid and 431 grams of catalyst ready for use were obtained.

Example 2

Into the amount of catalyst described in paragraph 1 of the above Example 1, at an equal CO pressure, within 6 hours a mixture of 18 mols (1520 grams) of 2-methylpentene-1 and 1200 grams of heptane, as well as 14 mols (250 grams) $H_2O$, were uniformly injected into the autoclave at 35–40° C. After injecting was terminated, the CO-pressure amounted to 105 atmospheres. From the 3833 grams of the reaction product obtained, 482 grams of catalyst ready for use, separated. This reaction product yielded, after being processed over the Na-salts and after fractionation under vacuum, 1873 grams (14.4 mols) of pure $\alpha,\alpha$-dimethylvaleric acid (boiling point$_{20}$ 110°, $n_D^{20}$ 1.4210, acid number 430), corresponding to a yield of 80% of the theory, based on the amount of 2-methylpentene-1 introduced into the reaction. Each $BF_3$ mol was here capable of synthetizing 4.8 mols $\alpha,\alpha$-dimethylvaleric acid. In addition, 192 grams (12.6% prior to charging) of olefin polymerization products (iodine number 108, $n_D^{20}$ 1.4336), 26 grams of lower and 84 grams of higher acids were isolated. The separated 482 grams catalyst were made up to 500 grams with fresh catalyst having the composition 3 mols $BF_3$:1.35 mols $H_2SO_4$:8.9 mols $H_2O$ and used for another batch with 1520 grams 2-methylpentene-1, 1200 grams heptane and 250 grams water and this batch was treated in the same manner as described above. After the reaction 476 grams of catalyst ready for use were separated and 1892 grams pure $\alpha,\alpha$-dimethylvaleric acid obtained.

The temperatures are stated herein in centigrades, and the parts and percent are by weight, if not otherwise stated.

The products prepared according to the process of the present invention can be used for various purposes, as examples of which the following are mentioned: the trimethylacetic acid can be used as plasticizer in zein compositions (U.S. Patent No. 2,410,124); as catalyst in dehydration of $CH_3CHO$ hydrate (C.A., vol. 44, p. 2352b); its barium salt can be used as resin stabilizer (C.A., vol. 44, p. 8364f); its calcium salt has tuberculostatic activity (C.A., vol. 48, 5359f).

Example 3

Under the same conditions as described in Example 2 a mixture consisting of 1680 g. of 2-ethyl-hexene-1 and 1000 g. of n-heptane in presence of a catalytically acting mixture of 88 g. $H_2SO_4$ and 135 $BF_3$ with carbon monoxide and 235 g. of water were brought to reaction in a V4A autoclave. The catalytically acting mixture was separated for re-use. After distillation of the reaction product 1988 g. of pure $\alpha$-methyl-$\alpha$-ethyl-heptane-acid (boiling point$_{20}$ 135–137° C., acid number 353, $n_D^{20}$ 1.4342) were obtained.

Example 4

Under the conditions of Example 2 a mixture consisting of 30% of 2-methylpentene(1) and 70% of 2-methylpentene(2) in place of 2-methylpentene(1) was introduced. Thereby 1861 g. of a mixture consisting of a bigger part of $\alpha$-methyl-$\alpha$-ethylbutyric acid and a smaller part of $\alpha,\alpha$-dimethylvaleric acid were obtained (boiling point$_{20}$ 110–115° C., acid number 430, $n_D^{20}$ 1.4234).

It will be understood from the present disclosure that the reaction of this invention is carried out in the presence of a catalyst which consists of a mixture of $BF_3$, water and sulfuric acid and the proportion $BF_3:H_2SO_4:H_2O$ is kept constant in the reaction zone by constant introduction of water into the reaction zone in an amount substantially equal to that consumed by formation of the carboxylic acid.

What is claimed is:

1. In a process for the preparation of alpha,alpha-dialkyl-branched monocarboxylic acids from olefins which are branched at the double bond and selected from the group consisting of iso-butylene, 2-methylpentene-1, 2-methylpentene-2, and 2-ethylhexene, with carbon monoxide and water in the presence of a sulfuric acid containing catalyst, the improvement of carrying out the reaction with a catalyst consisting of 40–45% by weight of $BF_3$, 23–27% by weight of $H_2SO_4$ and the balance $H_2O$, with continuous addition of the olefin, carbon monoxide and water, the water being introduced in an amount corresponding to the amount consumed by the formation of the carboxylic acid, the original proportion of $$BF_3:H_2SO_4:H_2O$$

being maintained and the reaction being carried out under a carbon monoxide pressure of 50–200 atmospheres in the temperature range of 20°–50° C.

2. A process as claimed in claim 1, in which the olefin is used in the reaction in diluted condition with heptane in order to reduce its isomerization.

3. A process as claimed in claim 2, in which the olefin is dissolved in heptane and carboxylic acids formed in the reaction, which are dissolved in heptane and are practically free from catalyst, are continuously discharged from the reaction.

4. A process as claimed in claim 1, in which trimethylacetic acid is prepared.

5. A process as claimed in claim 1, in which alpha,alpha-dimethylvaleric acid is prepared.

6. A process as claimed in claim 1, in which the reaction is carried out continuously and the carboxylic acid formed is continuously discharged.

References Cited in the file of this patent

UNITED STATES PATENTS 2,876,241    Koch et al. _____ Mar. 3, 1959